United States Patent
Lin et al.

(10) Patent No.: US 9,697,584 B1
(45) Date of Patent: Jul. 4, 2017

(54) MULTI-STAGE IMAGE SUPER-RESOLUTION WITH REFERENCE MERGING USING PERSONALIZED DICTIONARIES

(71) Applicant: Intel Corporation, Santa Clara, CA (US)

(72) Inventors: Chit Kwan Lin, New York, NY (US); Marcus Z. Comiter, Boca Raton, FL (US); Harnek Gulati, Cambridge, MA (US); Gautham N. Chinya, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1 day.

(21) Appl. No.: 14/757,982

(22) Filed: Dec. 26, 2015

(51) Int. Cl.
*G06T 3/40* (2006.01)
*G06K 9/62* (2006.01)

(52) U.S. Cl.
CPC .......... *G06T 3/4053* (2013.01); *G06K 9/6255* (2013.01); *G06K 9/6256* (2013.01)

(58) Field of Classification Search
USPC ....................................................... 382/299
See application file for complete search history.

(56) References Cited

U.S. PATENT DOCUMENTS

| | | | | |
|---|---|---|---|---|
| 8,290,251 B2 * | 10/2012 | Mahajan | ................... | G06K 9/40 382/159 |
| 8,682,086 B2 * | 3/2014 | Lin | ...................... | G06K 9/4676 382/232 |
| 9,036,885 B2 * | 5/2015 | Elad | ...................... | G06T 11/006 378/21 |
| 9,436,867 B2 * | 9/2016 | Kimura | ................ | G06K 9/0014 |
| 9,538,126 B2 * | 1/2017 | al-Salem | ................ | G06T 7/004 |
| 2007/0103595 A1 | 5/2007 | Gong et al. | | |
| 2014/0177706 A1 * | 6/2014 | Fernandes | ............ | H04N 19/463 375/240.03 |
| 2015/0154766 A1 | 6/2015 | Goshen et al. | | |
| 2015/0332435 A1 * | 11/2015 | Motohashi | ............ | G06T 3/4053 382/171 |
| 2016/0012314 A1 * | 1/2016 | Ramamurthy | ....... | G06K 9/6244 382/160 |

(Continued)

FOREIGN PATENT DOCUMENTS

WO    2014144306 A1    9/2014

OTHER PUBLICATIONS

Shuyuan Yang et al. Single Image Super Resoultion Reconstruction via Learned Geometric Dictionaries and Clustered Sparse Coding, IEEE 1057-7149, 2012, pp. 4016-4028.*

(Continued)

*Primary Examiner* — Ishrat I Sherali
(74) *Attorney, Agent, or Firm* — International IP Law Group, P.L.L.C.

(57) ABSTRACT

An apparatus for multi-stage super-resolution is described herein. The apparatus includes a personalized dictionary, a plurality of super-resolution stages, and a reference merger. Each of the plurality of super-resolution stages correspond to at least one personalized dictionary, and the personalized dictionary is applied to an input image that is sparse-coded to generate a reconstructed image. The reference merger is to merge the reconstructed image and the input image to generate a super-resolved image for each stage.

25 Claims, 7 Drawing Sheets

(56) References Cited

U.S. PATENT DOCUMENTS

2016/0078600 A1* 3/2016 Perez Pellitero ..... G06T 3/4053
362/155

OTHER PUBLICATIONS

Jianchao Yang et al. Coupled Dictionary Training for Image Super Resolution, IEEE 10576-714, 2012, pp. 3467-3478.*
PCT International Search Report, PCT Application No. PCT/US2016/059357, date of mailing Feb. 7, 2017, 3 pages.
Sajjad et al., "Image Super-Resolution Using Sparse Coding Over Redundant Dictionary Based on Effective Image Representations", J. Vis. Commun. Image R. (Elsevier), 2015, pp. 50-65, USA.
Wang et al., "Spatial Resolution Enhancement of Hyperspectral Images Based on Redundant Dictionaries", Journal of Applied Remote Sensing, vol. 9, 2015, 11 pages, USA.

* cited by examiner

400

500

MULTI-STAGE IMAGE SUPER-RESOLUTION WITH REFERENCE MERGING USING PERSONALIZED DICTIONARIES

BACKGROUND ART

High-quality images are often reconstructed from severely degraded images. For example, images captured by a mobile device may often be downsampled and/or highly compressed in order to satisfy a particular dimension or storage requirement. Super-resolution techniques may be applied to the low quality image to obtain a high quality image.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Methods for super-resolution can be performed by various techniques, such as combining images of similar resolution that are slightly misaligned, face hallucination under a Bayesian formulation, or face hallucination via sparse coding, among others. However, these super-resolution techniques may not provide actual high resolution image details, and often include regions of error in the final image. Moreover, these super-resolution techniques may be limited in the resolution or the quality of the image that can be obtained.

Embodiments described herein enable multi-stage super-resolution with reference merging. The present techniques provide an image processing method that recovers a high-quality image from a severely degraded one for personal images, such as those taken of a device's user. In embodiments, the input images described herein are of exceedingly small dimensions/storage size. Typically, these images are less than 1500 bytes or 1 maximum transmission unit (MTU) and are of extremely poor quality. The poor quality may be due to the intended use of the images. For example, these images may be low quality because they are intended to be efficiently transmitted over a network. These small, low-quality images are the result of applying multiple degradation operators such as lossy JPEG encoding and downsampling to the original, high-quality image. Given such a degraded image as input, the present techniques can recover a higher quality image on the order of 36× the input resolution. This contrasts with existing super-resolution techniques, in which the input is markedly less degraded in quality and typically larger in size, resulting in, for example, just 8× or 16× super-resolution.

Figure 1:
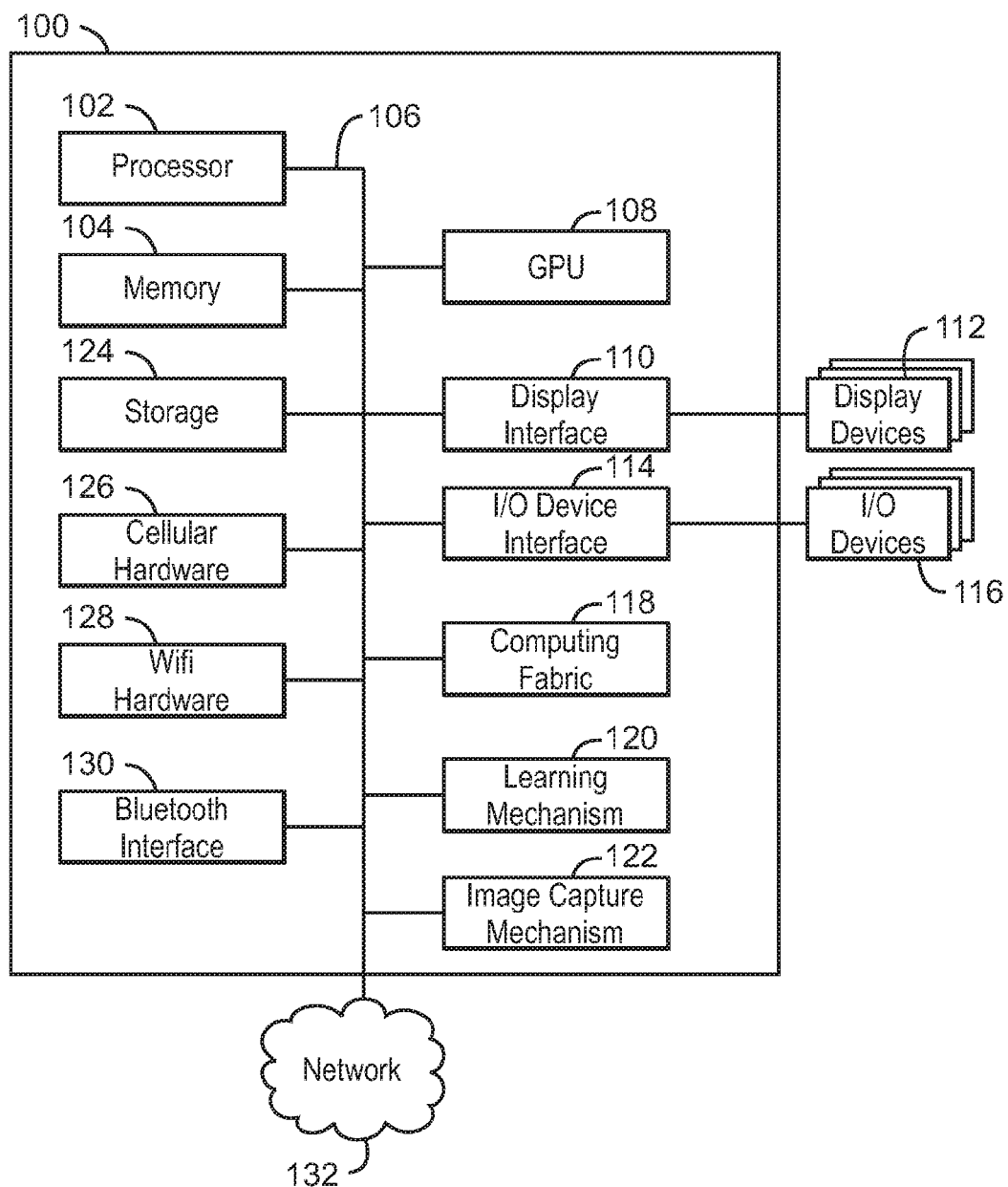
FIG. 1 is a block diagram of an exemplary device for multi-stage super-resolution with reference merging.

FIG. 1 is a block diagram of an exemplary device for multi-stage super-resolution with reference merging. The electronic device 100 may be, for example, a laptop computer, tablet computer, mobile phone, smart phone, or a wearable device, among others. The electronic device 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. Furthermore, the electronic device 100 may include more than one CPU 102. The memory device 104 can include random access memory (RAM), read only memory (ROM), flash memory, or any other suitable memory systems. For example, the memory device 104 may include dynamic random access memory (DRAM).

The electronic device 100 also includes a graphics processing unit (GPU) 108. As shown, the CPU 102 can be coupled through the bus 106 to the GPU 108. The GPU 108 can be configured to perform any number of graphics operations within the electronic device 100. For example, the GPU 108 can be configured to render or manipulate graphics images, graphics frames, videos, or the like, to be displayed to a user of the electronic device 100. In some embodiments, the GPU 108 includes a number of graphics engines, wherein each graphics engine is configured to perform specific graphics tasks, or to execute specific types of workloads.

The CPU 102 can be linked through the bus 106 to a display interface 110 configured to connect the electronic device 100 to one or more display devices 112. The display devices 112 can include a display screen that is a built-in component of the electronic device 100. The display devices 112 can also include a computer monitor, television, or projector, among others, that is externally connected to the electronic device 100.

The CPU 102 can also be connected through the bus 106 to an input/output (I/O) device interface 114 configured to connect the electronic device 100 to one or more I/O devices 116. The I/O devices 116 can include, for example, a keyboard and a pointing device, wherein the pointing device can include a touchpad or a touchscreen, among others. The I/O devices 116 can be built-in components of the electronic device 100, or can be devices that are externally connected to the electronic device 100.

The electronic device 100 also includes a computing fabric 118. As used herein, the computing fabric 118 includes nodes such as processor(s), memory, and/or peripherals, and links that are interconnects between the nodes. The computing fabric may be configured as a multi-stage super-resolution pipeline. A learning mechanism 120 may be used to create a personalized dictionary for a user. In embodiments, the learning mechanism creates a personalized dictionary that includes a number of atoms. Each atom is a portion of information regarding features of the user. An image capture mechanism 122 may be used to capture images of a specific user, which are used by the learning mechanism to produce a personalized dictionary.

Depending on the types and sequence of degradations applied to generate a low quality input image, the computing fabric 118 is configured into one or more stages to reverse each type of degradation. As used herein, a degradation operator is any action that causes a loss of resolution or information in an image. For example, a degradation operator may be compression, fractal compression, lossy compression, downsampling, format conversion, and the like. Each stage of the super-resolution pipeline reverses a particular cause of degradation, producing a reconstructed image. Reference merging is applied to this reconstruction after each stage. Reference merging is a regularization that amplifies the signal and sharpness of an input image while simultaneously mitigating error in areas that are poorly reconstructed.

The storage device 124 is a physical memory such as a hard drive, an optical drive, a flash drive, an array of drives, or any combinations thereof. The storage device 124 can store user data, such as audio files, video files, audio/video files, and picture files, among others. The storage device 124 can also store programming code such as device drivers, software applications, operating systems, and the like. The programming code stored to the storage device 124 may be executed by the CPU 102, GPU 108, or any other processors that may be included in the electronic device 100.

The CPU 102 may be linked through the bus 106 to cellular hardware 126. The cellular hardware 126 may be any cellular technology, for example, the 4G standard (International Mobile Telecommunications-Advanced (IMT-Advanced) Standard promulgated by the International Telecommunications Union—Radio communication Sector (ITU-R)). In this manner, the PC 100 may access any network 132 without being tethered or paired to another device, where the network 132 is a cellular network.

The CPU 102 may also be linked through the bus 106 to WiFi hardware 128. The WiFi hardware is hardware according to WiFi standards (standards promulgated as Institute of Electrical and Electronics Engineers' (IEEE) 802.11 standards). The WiFi hardware 128 enables the wearable electronic device 100 to connect to the Internet using the Transmission Control Protocol and the Internet Protocol (TCP/IP), where the network 132 is the Internet. Accordingly, the wearable electronic device 100 can enable end-to-end connectivity with the Internet by addressing, routing, transmitting, and receiving data according to the TCP/IP protocol without the use of another device. Additionally, a Bluetooth Interface 130 may be coupled to the CPU 102 through the bus 106. The Bluetooth Interface 130 is an interface according to Bluetooth networks (based on the Bluetooth standard promulgated by the Bluetooth Special Interest Group). The Bluetooth Interface 130 enables the wearable electronic device 100 to be paired with other Bluetooth enabled devices through a personal area network (PAN). Accordingly, the network 132 may be a PAN. Examples of Bluetooth enabled devices include a laptop computer, desktop computer, ultrabook, tablet computer, mobile device, or server, among others.

The block diagram of FIG. 1 is not intended to indicate that the electronic device 100 is to include all of the components shown in FIG. 1. Rather, the computing system 100 can include fewer or additional components not illustrated in FIG. 1 (e.g., sensors, power management integrated circuits, additional network interfaces, etc.). The electronic device 100 may include any number of additional components not shown in FIG. 1, depending on the details of the specific implementation. Furthermore, any of the functionalities of the CPU 102 may be partially, or entirely, implemented in hardware and/or in a processor. For example, the functionality may be implemented with an application specific integrated circuit, in logic implemented in a processor, in logic implemented in a specialized graphics processing unit, or in any other device.

Figure 2:
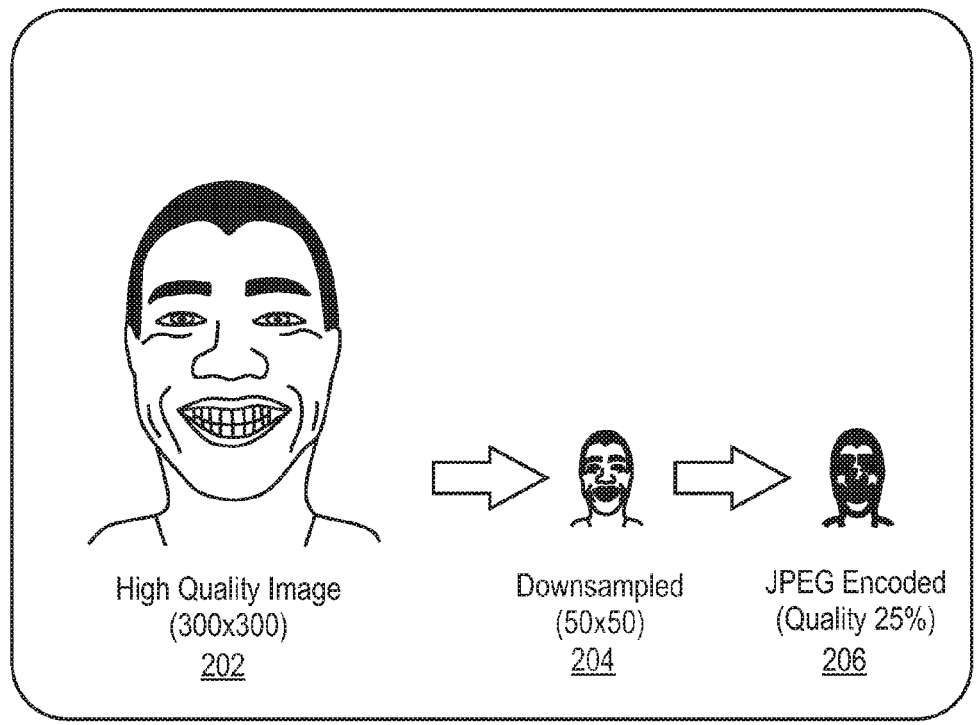
FIG. 2 is an illustration of an example sequence of degradation operators.

FIG. 2 is an illustration of a sequence 200 of degradation operators. The sequence 200 is used for descriptive purposes, and any number or particular sequence of degradation can be resolved according to the techniques described herein. The resolutions described herein are for descriptive purposes only. The techniques described herein may apply to any resolutions, and the degraded input may be scaled accordingly. For example, for an output image of 600×600 pixels, the desired input image may be 100×100 pixels.

A high quality image, such as the image 202, is the desired image and has a resolution of 300×300 pixels. This image is often downsampled to a resolution of 50×50 pixels as illustrated by the image 204. The downsampled image 204 may be compressed resulting in the image 206. In the degraded version, features such as the eyes appear as smudges of just a few pixels. The present techniques can successfully super-resolve these features to a high level of detail, such as a full eye with pupil. That is, a high-quality 300×300 pixel image may be recovered from the 50×50 downsampled, highly-compressed JPEG image 206.

Personalized dictionaries are used to super-resolve features of a low-quality image from just a few pixels to a feature with a high level of detail. In embodiments, the super-resolution is performed through a number of successive stages. Since a large number of images or video captured by a mobile device are mostly personal, i.e., they are generated by or taken of the device's owner, these personal images can be used to learn dictionaries personalized to the owner. By using dictionaries that capture high-quality features personalized to a user, even small image details missing in the low-quality image can be recovered to produce a high-quality reconstruction for that user. In embodiments, the personalized dictionary is a dynamic dictionary that can be updated on the fly. Atoms of the dictionary can be added a replaced as necessary.

Figure 3:
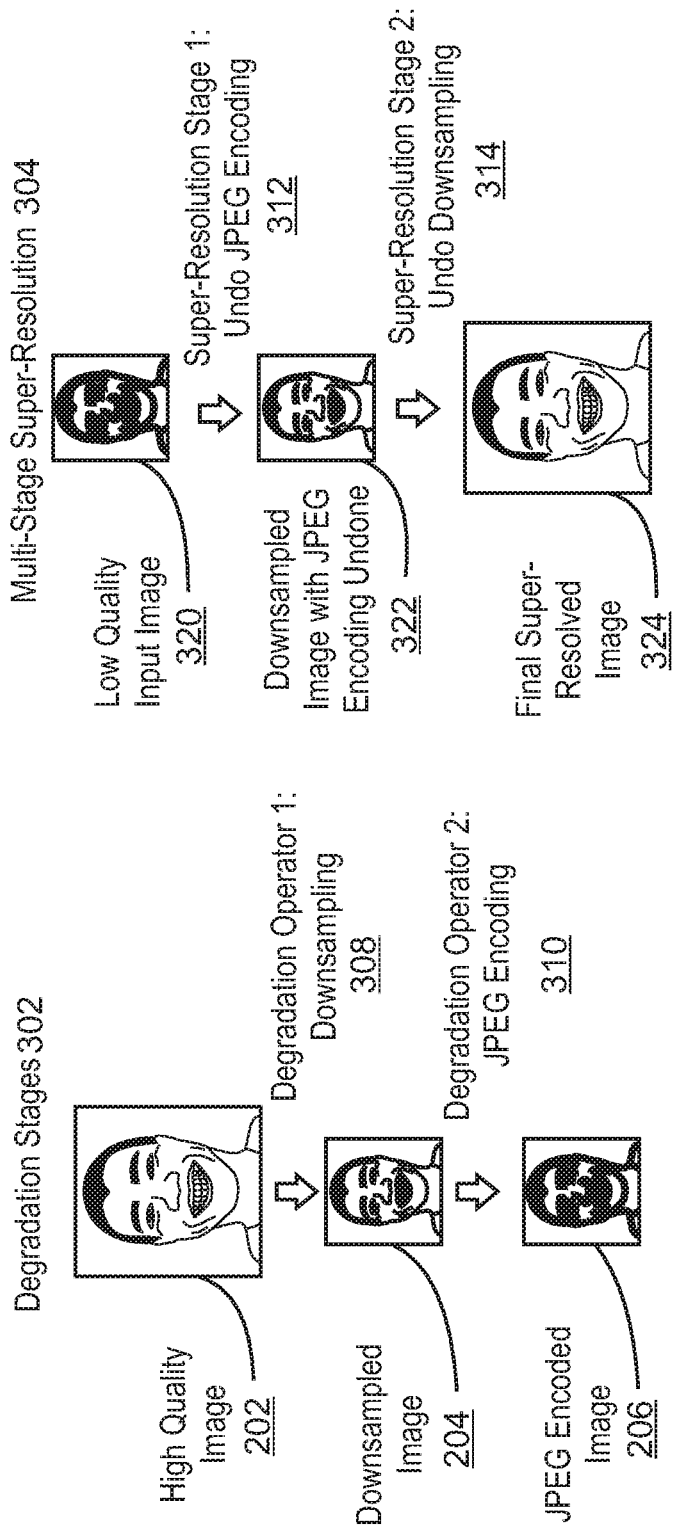
FIG. 3 is a block diagram of an enumeration of the multi-stage image super-resolution using personalized dictionaries.

FIG. 3 is a block diagram of an enumeration 300 of the multi-stage image super-resolution using personalized dictionaries. Similar to FIG. 2, FIG. 3 includes a high quality image 202, a downsampled image 204, and a low-quality image 206. Accordingly, the degradation stages 302 include a first degradation operator 308 that includes downsampling the high-quality image 202. The degradation stages 302 also include a second degradation operator that applies lossy JPEG encoding to the downsampled image 204 to produce a low-quality image 206.

The multi-stage super-resolution 304 includes a first super-resolution stage 312 that is to undo the last degradation operator 310, resulting in an approximate reconstruction 322 of the downsampled image 204. A second super-resolution stage 314 that is to undo the remaining degradation operator 308, resulting in an approximate reconstruction 324 of the high quality image 202. While the multi-stage super-resolution 304 is described as corresponding to the degradation stages 302 in a particular order, the super-resolution stages may be applied to the low quality image in a different order, depending on the system design and requirements.

By enumerating the degradation steps as described above, the sequence and type of degradation relative to the desired high-quality image is delineated. As an example, consider the case in which a low-quality 50×50 JPEG thumbnail produced by the degradation steps 302 (FIG. 3) is to be super-resolved to a 300×300 pixel high-quality image. The multi-stage super-resolution stages are enumerated according to the particular degradation sequence that has been discovered. In embodiments, given a degradation sequence, the super-resolution stages needed to reconstruct the desired image are enumerated by reversing the sequence. Each stage corresponds to one degradation operator.

The super-resolution described herein can tolerate extremely degraded personal images as input. According to the examples described herein, using a personalized dictionary, a high-quality 300×300 image can be recovered showing significant detail (e.g., nose definition, pupils in the eyes, sharp jaw line) from a previously unseen low-quality 50×50 JPEG thumbnail. The robust nature of the multi-stage resolution is due to learned models of probable inputs for a user at high resolution/quality. The learned models may be in the form of personalized dictionaries that can then be used to systematically add back information lost to the degradation operators. In this manner, severe degradation of the original input can be tolerated. Using personalized dictionaries results in only the intended subject being super-resolved, which is a desirable property for many potential applications. For example, potential applications may include privacy protection in security/surveillance applications, enhance only the speaker in a video conference, etc.

Figure 4:
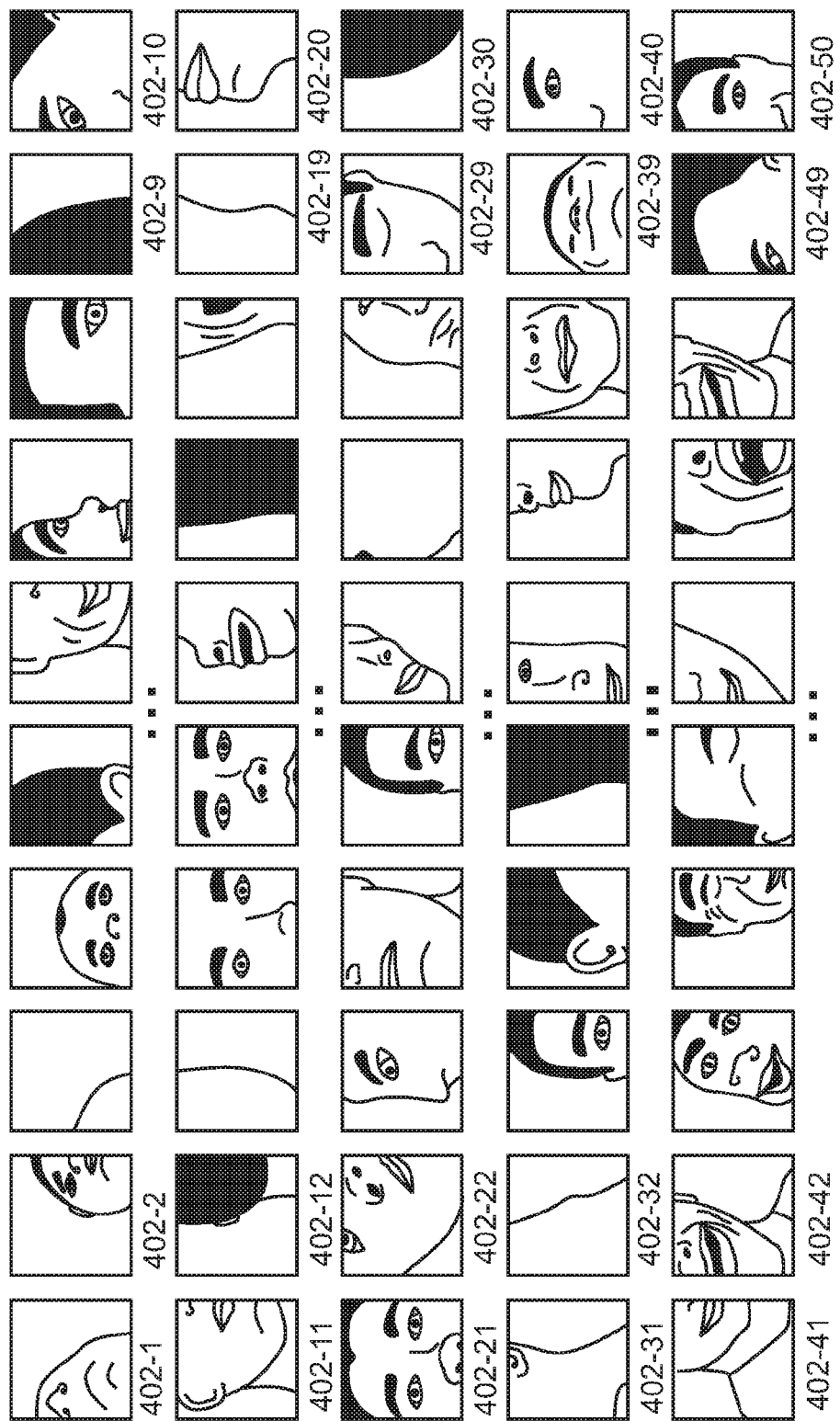
FIG. 4 is an example of a personalized dictionary.

FIG. 4 is an example of a personalized dictionary 400. The dictionary 400 has been personalized for a single user, and includes a plurality of atoms 402. In particular, the dictionary 400 includes atoms 402-1, 402-2, 403-3, . . . , 402-49, and 402-50. While a particular number of atoms have been illustrated, the personalized dictionary can include any number of atoms. Each atom includes image information regarding features of a single user.

Traditional super-resolution algorithms typically use a dictionary of generic atoms. For example, a traditional super-resolution image may use Gabor-like features, rather than personalized features found in the personalized dictionary. Generic dictionaries limit the extent to which the input image can be degraded and still be super-resolved to a high quality. The present techniques result in a pool of accurate and reliable additional information that the personalized dictionaries can inject into the super-resolved image, resulting in a higher-quality super-resolved image. For example, in a dictionary trained on a specific person's face, an atom could contain valuable information capturing the specific shape of that person's eye and its spatial relationship to that person's nose, all of which implicitly impose helpful constraints on the reconstruction. In contrast, super-resolving with generic Gabor-like features would have many more degrees of freedom. As a point of reference, traditional techniques may reconstruct a 100×100 image from a 25×25 downsampled image, achieving a 16×super-resolution, whereas the present techniques can achieve 36×super-resolution by obtaining a 300×300 image from a downsampled and JPEG encoded 50×50 image. Furthermore, given training data that encompasses different poses of the user, personalized dictionaries can also capture features as seen from these different angles (e.g., face turned 10 degrees to the left) and can thus reconstruct a variety of different user poses.

Moreover, compared to traditional super-resolution, the present techniques can handle much lower-quality input images because the information contained in the personalized dictionaries can compensate for the information lost to severe degradations. This is important to applications for which there is a sizeable cost to using or capturing higher-quality images. For example, camera image signal processors can be made more power-efficient if images of the user can be captured at low quality and super-resolved. Additionally, networked applications can avoid the prohibitively large network cost of sending big files.

At a high level, dictionary learning seeks to find an overcomplete basis of atoms in which input signals can be approximately expressed as a linear combination of just a few atoms. These dictionaries are then used in sparse coding, which is the process of finding which (few) atoms should be used in representing an input signal. As discussed above, a personalized dictionary is one trained on images that are personal to the user (e.g., of the user herself), wherein the atoms that are learned capture details that are specific to the user, and can be used effectively in reference merging as discussed below. The personalized dictionaries can be formed using a variety of methods, such as the least absolute shrinkage and selection operator (LASSO) technique. In particular, the training images may be split into image patches (subimages), which are then used to derive features via LASSO.

Note that atoms/features 402 of the personalized dictionary are not simply patches that are directly copied from input images. Instead, through the training process, each atom's pixel values are determined such that the entire set of atoms, i.e., the dictionary, minimizes the LASSO objective function. Intuitively, this means that an atom's pixel values are selected such that the atom will likely be useful in reconstructing an unseen image.

Figure 5:
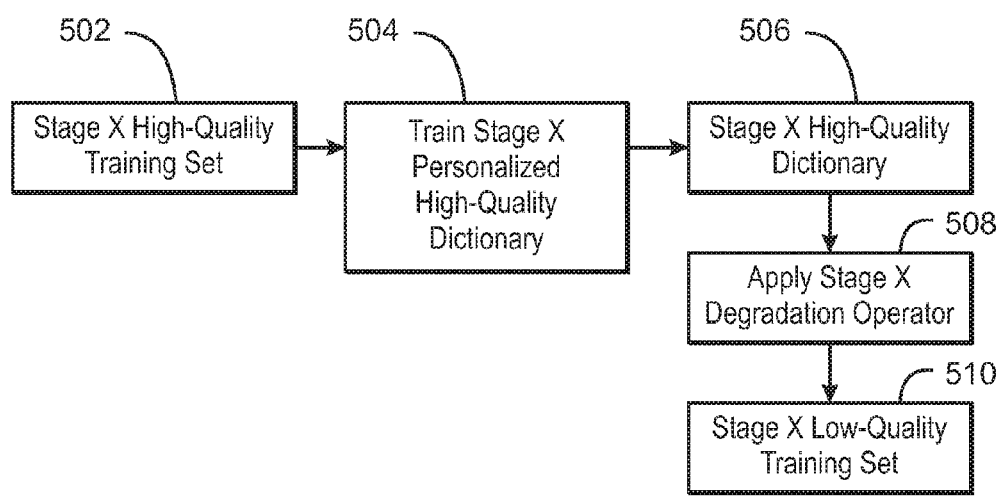
FIG. 5 is a process flow diagram for learning low- and high-quality personalized dictionaries.

FIG. 5 shows a process flow 500 for training the personalized dictionaries of each stage of the multi-stage super-resolution, such as the multi-stage super-resolution 304 (FIG. 3). In particular, two dictionaries may be generated for each stage, a high-quality dictionary 506 trained on images 502 of the same quality as the desired output of that stage and a low-quality dictionary 510 generated by applying that stage's degradation operator 508 to the atoms in the high-quality dictionary 506.

Continuing the example from FIG. 3 as applied to the proceed described in FIG. 5, at block 502 a training set including images for a first super-resolution stage 312 of the multi-stage super resolution is generated. At block 504, the high quality dictionary is trained on 50×50 images that have not been JPEG-encoded, resulting in the high quality dictionary of block 506. At block 508, the corresponding low-quality dictionary 510 is generated by applying the degradation operator of stage 312, which is encoding the atoms of the high-quality dictionary with JPEG. Similarly, for the second super-resolution stage 314, a high-quality dictionary would be trained on 300×300 images, and the corresponding low-quality dictionary would be generated by downsampling the atoms by a factor of 36.

In the present techniques, each stage calculates a sparse code of its input using a low-quality dictionary and reconstructs the resulting sparse code with its high-quality dictionary, thereby achieving super-resolution. Because each stage effectively reverses the effects of a particular degradation operator, every stage improves on the result from the previous stage, by adding distinct information back to the image. In the examples above, when super-resolving an image that has been downsampled and subsequently JPEG encoded, the first stage of super-resolution would add back information lost in the JPEG encoding process, while the subsequent stage adds back information lost when downscaling the original image to a thumbnail.

Figure 6:
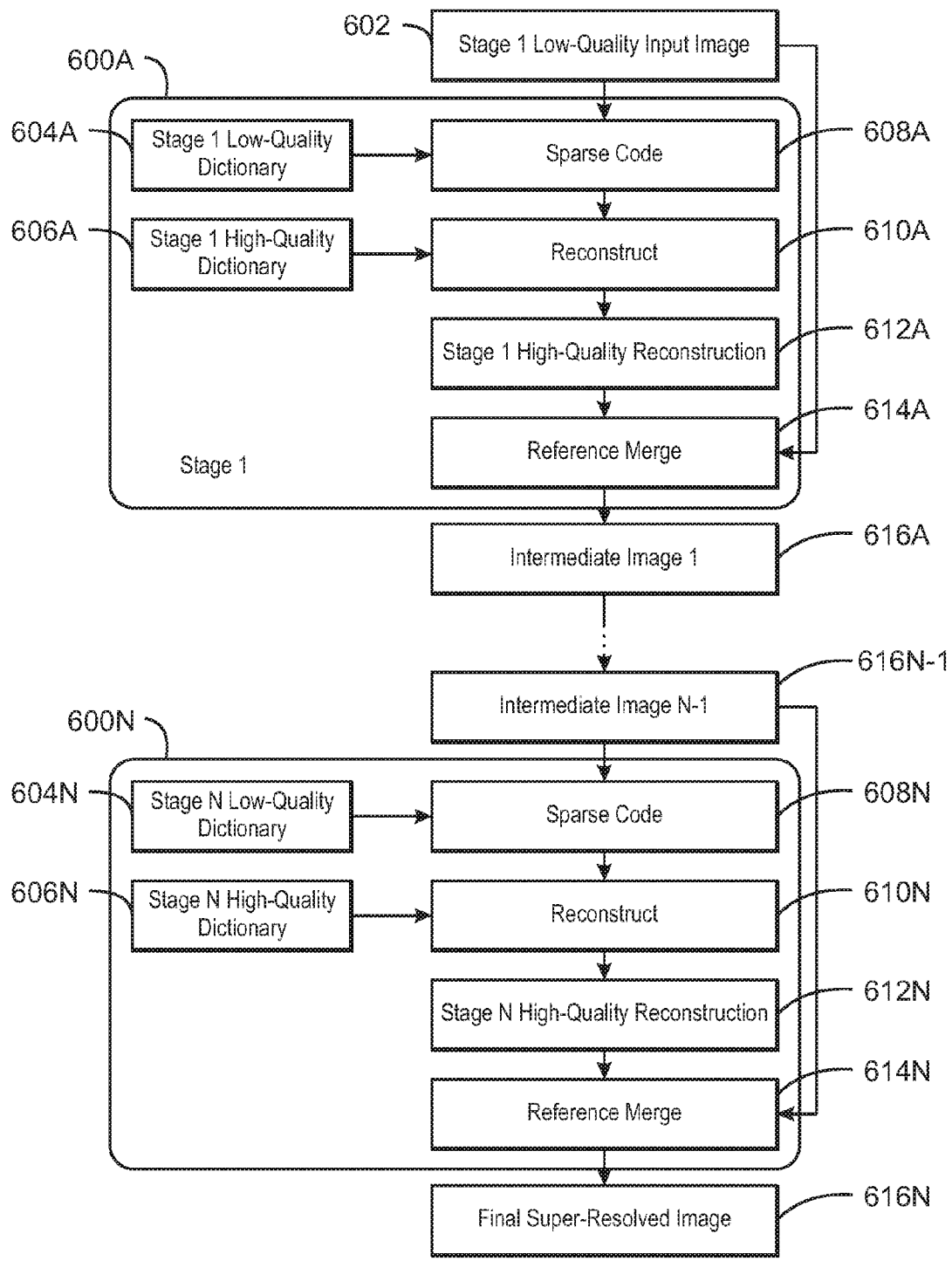
FIG. 6 is a process flow diagram of a method for multi-stage super-resolution with reference merging using low- and high-quality personalized dictionaries at each stage.

FIG. 6 is a process flow diagram illustrating multi-stage super-resolution with reference merging using low-quality and high-quality dictionaries. The process begins when the low-quality input image 602 is received. At a first super-resolution stage 600A, the input image 602 may be encoded (i.e., sparse coded 608A) with a low-quality dictionary 604A. At reference number 610A, the encoding is reconstructed using a high-quality dictionary 606A, resulting in a reconstructed image 612A. The reconstruction 612A is then reference merged at block 614A with input image 602, producing intermediate image 616A. Intermediate image 616A is then fed as input into the subsequent stage, and this technique is performed at each of the N number of stages. Thus, at an Nth stage 600N, the intermediate image 616N−1 from the (N−1)th stage may be sparse coded 608N with a low-quality dictionary 604N, and at reference number 610N, the encoding is reconstructed using a high-quality dictionary 606N, resulting in reconstruction 612N. This reconstruction is then reference merged at block 614N with the intermediate image 616N−1 of the (N−1)th stage to produce the final super-resolved image 616N.

By sparse coding the input image using a low-quality dictionary and then reconstructing the sparse code using its corresponding high-quality dictionary, the degradation operator of a stage is reversed. Thus, for each stage, a low-quality input image is sparse coded and the high quality image is obtained by reconstruction. The low-quality input image may be sparse coded using the low-quality dictionary via known methods such as orthogonal matching pursuit (OMP) or LASSO. The high-quality image may be obtained by reconstructing the image as a linear combination of high-quality dictionary atoms as specified by the sparse code obtained in the previous step.

The reconstruction accuracy at each stage depends on the quality of the input image. For example, in areas of the input image with little or no information, super-resolution may produce a blurry reconstruction or worse, reconstruct the areas incorrectly by choosing the wrong atoms. Reference merging addresses both of these issues by selectively merging the higher-quality super-resolved image with the lower-quality original (reference) image such that in areas where the two images agree, pixel information from the super-resolved image is used, while in areas where the two images disagree, that from the reference image is used. As used herein, where pixel values agree or are very similar, the resulting pixel value (which is a combination of both the reconstruction pixel value and the reference pixel value) weights more heavily in favor of the reconstruction pixel value and less on the reference pixel value. For example, if the pixel difference is just 10%, then the resulting pixel value=(0.9*reconstruction pixel value)+(0.1*reference pixel value).

As an illustrative example, consider an image of a person's face. In this case, reference merging will amplify the signal of large, significant features such as the outline of the face and hair that are were correctly reconstructed, while retaining the original information from smaller features such as subtle facial expressions, which may have been incorrectly super-resolved.

Specifically, after each stage of super-resolution is completed, reference merging calculates a "difference map", then calculates a reference merged image. A difference map between the stage's reconstruction and reference image may be calculated as follows:

$$diff = \frac{255 - |\text{reconstructed image} - \text{reference image}|}{255}$$

where 255 is the maximum pixel value. This difference map describes where the reconstruction and reference image are similar and where they are different. The final reference merged image is constructed according to the following equation for each pixel i:

Reference Merged$_i$=diff$_i$*reconstruction$_i$+(1−diff$_i$)
*reference image$_i$ Reference merging prevents a form of overfitting when performing multi-stage super-resolution; it thus serves as a regularization of each super-resolution stage and reduces error accumulation over multiple stages. While the reference merging equations described herein use individual pixel values, any measure of image elements may be used, for example pixel neighborhoods or convolved filter windows.

Personalized dictionary learning trains dictionaries comprised of features specific to a given user. Personalized dictionaries trained on a single user's images are key to enabling multi-stage resolution and reference merging. For reference merging to function properly, dictionary atoms selected for the sparse code must match large areas or prominent features of the reference image. This property generally holds between personal images and atoms in the user's personalized dictionary, since the dictionary was trained from the user's personal image data.

Figure 7:
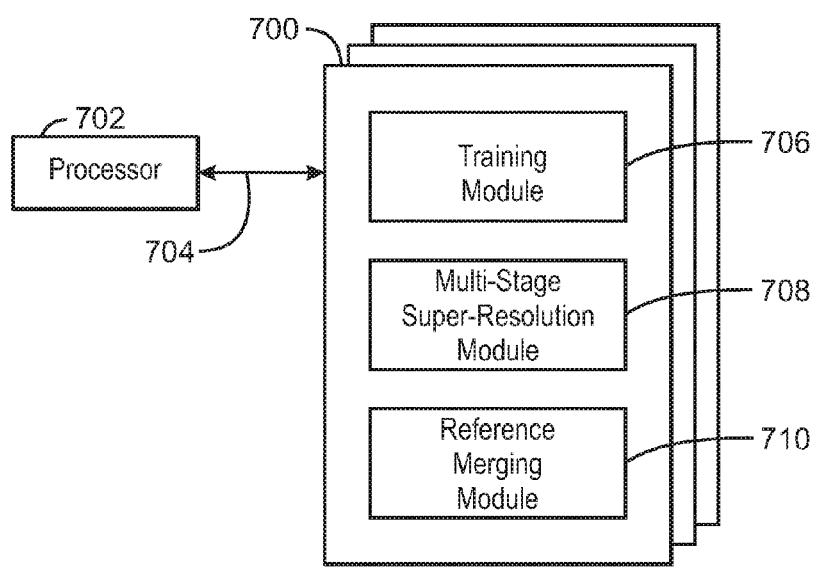
FIG. 7 is a block diagram showing a medium that contains logic for multi-stage super-resolution.

FIG. 7 is a block diagram showing a medium 700 that contains logic for multi-stage super-resolution. The medium 700 may be a computer-readable medium, including a non-transitory medium that stores code that can be accessed by a processor 702 over a computer bus 704. For example, the computer-readable medium 700 can be volatile or non-volatile data storage device. The medium 700 can also be a logic unit, such as an Application Specific Integrated Circuit (ASIC), a Field Programmable Gate Array (FPGA), or an arrangement of logic gates implemented in one or more integrated circuits, for example.

The medium 700 may include modules 706-710 configured to perform the techniques described herein. For example, a training module 706 may be to train personalized dictionaries for a particular user. A multi-stage super-resolution module 708 may be configured to enumerate stages that are to stage adds back to the input image information lost to a distinct degradation operator. A reference merging module 710 may be configured to selectively merge the super-resolved image with the original (reference) image at each stage. In some embodiments, the modules 707-712 may be modules of computer code configured to direct the operations of the processor 702.

The block diagram of FIG. 7 is not intended to indicate that the medium 700 is to include all of the components shown in FIG. 7. Further, the medium 700 may include any number of additional components not shown in FIG. 7, depending on the details of the specific implementation.

Example 1 is an apparatus. The apparatus includes a plurality of personalized dictionaries; a plurality of super-resolution stages, wherein each of the plurality of super-resolution stages correspond to at least one personalized dictionary and the personalized dictionary is applied to an input image that is sparse-coded to generate a reconstructed image; and a reference merger to merge the reconstructed image and the input image to generate a super-resolved image.

Example 2 includes the apparatus of example 1, including or excluding optional features. In this example, each stage of the plurality of super-resolution stages adds information to the input image lost to a distinct degradation operator.

Example 3 includes the apparatus of any one of examples 1 to 2, including or excluding optional features. In this example, each stage of the plurality of super-resolution stages uses one personalized dictionary in the plurality of personalized dictionaries.

Example 4 includes the apparatus of any one of examples 1 to 3, including or excluding optional features. In this example, the input image is sparse-coded using a second, low-quality personalized dictionary.

Example 5 includes the apparatus of any one of examples 1 to 4, including or excluding optional features. In this example, the plurality of personalized dictionaries are trained on images that are personalized to a user.

Example 6 includes the apparatus of any one of examples 1 to 5, including or excluding optional features. In this example, each dictionary of the plurality of dictionaries comprises an overcomplete basis of atoms.

Example 7 includes the apparatus of any one of examples 1 to 6, including or excluding optional features. In this example, each dictionary of the plurality of dictionaries comprises atoms that capture details specific to a user.

Example 8 includes the apparatus of any one of examples 1 to 7, including or excluding optional features. In this example, pixel values of atoms of each personalized dictionary of the plurality of dictionaries are selected to minimize an objective function of a dictionary training algorithm.

Example 9 includes the apparatus of any one of examples 1 to 8, including or excluding optional features. In this example, each stage of the plurality of super-resolution stages corresponds to a degradation operator.

Example 10 includes the apparatus of any one of examples 1 to 9, including or excluding optional features. In this example, a sparse code of an input image is obtained by approximating the input image with a linear combination of atoms from a low-quality dictionary.

Example 11 is a method for multi-stage super-resolution. The method includes generating a plurality of super-resolution stages, wherein each stage corresponds to a degradation operator and at least one personalized dictionary; reconstructing an input image at each super-resolution stage, wherein the at least one personalized dictionary is applied to a sparse code to form a reconstructed image; and applying reference merging to the reconstructed image and the input image to eliminate error in the reconstructed image.

Example 12 includes the method of example 11, including or excluding optional features. In this example, a second personalized dictionary provides data to calculate a sparse code and reconstruct an image from the sparse code using the at least one personalized dictionary. Optionally, the second personalized dictionary for each stage is generated by applying the degradation operator to atoms in the at least one dictionary for each stage.

Example 13 includes the method of any one of examples 11 to 12, including or excluding optional features. In this example, the at least one personalized dictionary systematically adds information lost due to the degradation operator to the input image to obtain the reconstructed image.

Example 14 includes the method of any one of examples 11 to 13, including or excluding optional features. In this example, reference merging selectively merges the reconstructed image with the input image.

Example 15 includes the method of any one of examples 11 to 14, including or excluding optional features. In this example, in response to a portion of the reconstructed image being unequal to a portion of the input image, the portion of the input image is used to merge pixels in the portion of the reconstructed image.

Example 16 includes the method of any one of examples 11 to 15, including or excluding optional features. In this example, reference merging comprises using a difference map to determine areas of error in the higher quality image.

Example 17 includes the method of any one of examples 11 to 16, including or excluding optional features. In this example, the personalized dictionary comprises atoms for a single user.

Example 18 includes the method of any one of examples 11 to 17, including or excluding optional features. In this example, the multi-stage super-resolution results in an increase of image resolution of at least 36 times an original image resolution.

Example 19 includes the method of any one of examples 11 to 18, including or excluding optional features. In this example, a learning mechanism is used to generate the personalized dictionary.

Example 20 is a tangible, non-transitory, computer-readable medium. The computer-readable medium includes instructions that direct the processor to generate a plurality of super-resolution stages, wherein each stage corresponds to a degradation operator and at least one personalized dictionary; reconstruct an input image at each super-resolution stage, wherein the at least one personalized dictionary is applied to a sparse code to form a reconstructed image; and apply reference merging to the reconstructed image and the input image to eliminate error in the reconstructed image.

Example 21 includes the computer-readable medium of example 20, including or excluding optional features. In this example, a second personalized dictionary provides data to calculate a sparse code and reconstruct an image from the sparse code using the at least one personalized dictionary. Optionally, the second personalized dictionary for each stage is generated by applying the degradation operator to atoms in the at least one dictionary for each stage.

Example 22 includes the computer-readable medium of any one of examples 20 to 21, including or excluding optional features. In this example, the at least one personalized dictionary systematically adds information lost due to the degradation operator to the input image to obtain the reconstructed image.

Example 23 includes the computer-readable medium of any one of examples 20 to 22, including or excluding optional features. In this example, reference merging selectively merges the reconstructed image with the input image.

Example 24 includes the computer-readable medium of any one of examples 20 to 23, including or excluding optional features. In this example, in response to a portion of the reconstructed image being unequal to a portion of the input image, the portion of the input image is used to merge pixels in the portion of the reconstructed image.

Example 25 includes the computer-readable medium of any one of examples 20 to 24, including or excluding optional features. In this example, reference merging comprises using a difference map to determine areas of error in the higher quality image.

Example 26 includes the computer-readable medium of any one of examples 20 to 25, including or excluding optional features. In this example, the personalized dictionary comprises atoms for a single user.

Example 27 includes the computer-readable medium of any one of examples 20 to 26, including or excluding optional features. In this example, the multi-stage super-resolution results in an increase of image resolution of at least 36 times an original image resolution.

Example 28 includes the computer-readable medium of any one of examples 20 to 27, including or excluding optional features. In this example, a learning mechanism is used to generate the personalized dictionary.

Example 29 is a system. The system includes instructions that direct the processor to an image capture mechanism; a memory that is to store instructions and that is communicatively coupled to the image capture mechanism and the display; and a processor communicatively coupled to the image capture mechanism, the display, and the memory, wherein when the processor is to execute the instructions, the processor is to: form a plurality of super-resolution stages, wherein each stage of the plurality of super-resolution stages correspond to at least one personalized dictionary and the personalized dictionary is applied to an input image that is sparse-coded to generate a reconstructed image; and a reference merger to merge the reconstructed image and the input image to generate a super-resolved image.

Example 30 includes the system of example 29, including or excluding optional features. In this example, each stage of the plurality of super-resolution stages adds information to the input image lost to a distinct degradation operator.

Example 31 includes the system of any one of examples 29 to 30, including or excluding optional features. In this example, the input image is sparse coded using a second, low-quality personalized dictionary.

Example 32 includes the system of any one of examples 29 to 31, including or excluding optional features. In this example, the one personalized dictionary for each stage is trained on images that are personalized to a user.

Example 33 includes the system of any one of examples 29 to 32, including or excluding optional features. In this example, the one personalized dictionary for each stage comprises an overcomplete basis of atoms.

Example 34 includes the system of any one of examples 29 to 33, including or excluding optional features. In this example, the one personalized dictionary for each stage comprises atoms to capture details that are specific to a user.

Example 35 includes the system of any one of examples 29 to 34, including or excluding optional features. In this example, pixel values of atoms of the one personalized dictionary for each stage are selected to minimize an objective function of a dictionary training algorithm.

Example 36 includes the system of any one of examples 29 to 35, including or excluding optional features. In this example, each stage of the plurality of super-resolution stages corresponds to a degradation operator.

Example 37 includes the system of any one of examples 29 to 36, including or excluding optional features. In this example, a sparse code of an input image is obtained by approximating the input image with a linear combination of atoms from a low-quality dictionary.

Example 38 includes the system of any one of examples 29 to 37, including or excluding optional features. In this example, the input image is sparse-coded using a second, low-quality personalized dictionary and the second, low-quality personalized dictionary is obtained by downsampling the atoms of the at least one personalized dictionary.

Example 39 is an apparatus. The apparatus includes instructions that direct the processor to a plurality of personalized dictionaries; a means to reconstruct a sparse-coded input image; and a reference merger to merge the reconstructed image and the input image to generate a super-resolved image.

Example 40 includes the apparatus of example 39, including or excluding optional features. In this example, each stage of the means to reconstruct the sparse-coded input image adds information to the input image lost to a distinct degradation operator.

Example 41 includes the apparatus of any one of examples 39 to 40, including or excluding optional features. In this example, each stage of the means to reconstruct a sparse coded input image uses one personalized dictionary in the plurality of personalized dictionaries.

Example 42 includes the apparatus of any one of examples 39 to 41, including or excluding optional features. In this example, the input image is sparse-coded using a second, low-quality personalized dictionary.

Example 43 includes the apparatus of any one of examples 39 to 42, including or excluding optional features. In this example, the plurality of personalized dictionaries are trained on images that are personalized to a user.

Example 44 includes the apparatus of any one of examples 39 to 43, including or excluding optional features. In this example, each dictionary of the plurality of dictionaries comprises an overcomplete basis of atoms.

Example 45 includes the apparatus of any one of examples 39 to 44, including or excluding optional features. In this example, each dictionary of the plurality of dictionaries comprises atoms to capture details that are specific to a user.

Example 46 includes the apparatus of any one of examples 39 to 45, including or excluding optional features. In this example, pixel values of atoms of each personalized dictionary of the plurality of dictionaries are selected to minimize an objective function of a dictionary training algorithm.

Example 47 includes the apparatus of any one of examples 39 to 46, including or excluding optional features. In this example, each stage of the means to reconstruct a sparse-coded input image corresponds to a degradation operator.

Example 48 includes the apparatus of any one of examples 39 to 47, including or excluding optional features. In this example, a sparse code of an input image is obtained by approximating the input image with a linear combination of atoms from a low-quality dictionary.

Some embodiments may be implemented in one or a combination of hardware, firmware, and software. Some embodiments may also be implemented as instructions stored on the tangible, non-transitory, machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus, comprising:
   a plurality of personalized dictionaries;
   a plurality of super-resolution stages, wherein each of the plurality of super-resolution stages correspond to at least one personalized dictionary and the personalized dictionary is applied to an input image that is sparse-coded to generate a reconstructed image; and
   a reference merger to merge the reconstructed image and the input image to generate a super-resolved image for each stage.

2. The apparatus of claim 1, wherein each stage of the plurality of super-resolution stages adds information to the input image lost to a distinct degradation operator.

3. The apparatus of claim 1, wherein each stage of the plurality of super-resolution stages uses at least one personalized dictionary in the plurality of personalized dictionaries.

4. The apparatus of claim 1, wherein the input image is sparse-coded using a second, low-quality personalized dictionary.

5. The apparatus of claim 1, wherein the plurality of personalized dictionaries are trained on images that are personalized to a user.

6. A method for multi-stage super-resolution, comprising:
   generating a plurality of super-resolution stages, wherein each stage corresponds to a degradation operator and at least one personalized dictionary;
   reconstructing an input image at each super-resolution stage, wherein the at least one personalized dictionary is applied to a sparse code to form a reconstructed image; and
   applying reference merging to the reconstructed image and the input image to reduce error in the reconstructed image.

7. The method of claim 6, wherein a second personalized dictionary provides data to calculate a sparse code and reconstruct an image from the sparse code using the at least one personalized dictionary.

8. The method of claim 7, wherein the second personalized dictionary for each stage is generated by applying the degradation operator to atoms in the at least one dictionary for each stage.

9. The method of claim 6, wherein the at least one personalized dictionary systematically adds information lost due to the degradation operator to the input image to obtain the reconstructed image.

10. The method of claim 6, wherein reference merging selectively merges the reconstructed image with the input image.

11. The method of claim 6, wherein in response to a portion of the reconstructed image being unequal to a portion of the input image, the portion of the input image is used to merge pixels in the portion of the reconstructed image.

12. The method of claim 6, wherein reference merging comprises using a difference map to determine areas of error in the higher quality image.

13. The method of claim 6, wherein the personalized dictionary comprises atoms for a single user.

14. The method of claim 6, wherein the multi-stage super-resolution results in an increase of image resolution of at least 36 times an original image resolution.

15. The method of claim 6, wherein a learning mechanism is used to generate the personalized dictionary.

16. A tangible, non-transitory, computer-readable medium comprising instructions that, when executed by a processor, direct the processor to:
   generate a plurality of super-resolution stages, wherein each stage corresponds to a degradation operator and at least one personalized dictionary;
   reconstruct an input image at each super-resolution stage, wherein the at least one personalized dictionary is applied to a sparse code to form a reconstructed image; and
   apply reference merging to the reconstructed image and the input image to eliminate error in the reconstructed image.

17. The computer readable medium of claim 16, wherein a second personalized dictionary provides data to calculate a sparse code and reconstruct an image from the sparse code using the at least one personalized dictionary.

18. The computer readable medium of claim 17, wherein the second personalized dictionary for each stage is generated by applying the degradation operator to atoms in the at least one dictionary for each stage.

19. The computer readable medium of claim 16, wherein the at least one personalized dictionary systematically adds information lost due to the degradation operator to the input image to obtain the reconstructed image.

20. The computer readable medium of claim 16, wherein reference merging selectively merges the reconstructed image with the input image.

21. A system, comprising:
an image capture mechanism;
a memory that is to store instructions and that is communicatively coupled to the image capture mechanism and the display; and
a processor communicatively coupled to the image capture mechanism, the display, and the memory, wherein when the processor is to execute the instructions, the processor is to:
form a plurality of super-resolution stages, wherein each stage of the plurality of super-resolution stages correspond to at least one personalized dictionary and the personalized dictionary is applied to an input image that is sparse-coded to generate a reconstructed image; and
a reference merger to merge the reconstructed image and the input image to generate a super-resolved image for each stage.

22. The system of claim 21, wherein each stage of the plurality of super-resolution stages adds information to the input image lost to a distinct degradation operator.

23. The system of claim 21, wherein the input image is sparse-coded using a second, low-quality personalized dictionary.

24. The system of claim 21, wherein the at least one personalized dictionary for each stage is trained on images that are personalized to a user.

25. The system of claim 21, wherein the at least one personalized dictionary for each stage comprises an overcomplete basis of atoms.

* * * * *